United States Patent
Cherches et al.

(10) Patent No.: US 12,393,424 B2
(45) Date of Patent: Aug. 19, 2025

(54) SYSTEMS AND METHODS FOR MONITORING AN INSTRUCTION BUS

(71) Applicant: TEXAS INSTRUMENTS INCORPORATED, Dallas, TX (US)

(72) Inventors: Barak Cherches, Ramat HaKovesh (IL); Clive David Bittlestone, Allen, TX (US); Uri Weinrib, Mazkeret Batya (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/423,049

(22) Filed: Jan. 25, 2024

(65) Prior Publication Data

US 2025/0245009 A1    Jul. 31, 2025

(51) Int. Cl.
| | |
|---|---|
| G06F 9/38 | (2018.01) |
| G06F 9/44 | (2018.01) |
| G06F 9/4401 | (2018.01) |
| G06F 21/52 | (2013.01) |
| G06F 21/56 | (2013.01) |

(52) U.S. Cl.
CPC .......... G06F 9/3802 (2013.01); G06F 9/3814 (2013.01); G06F 9/4403 (2013.01); G06F 21/52 (2013.01); G06F 21/566 (2013.01)

(58) Field of Classification Search
None
See application file for complete search history.

(56) References Cited

U.S. PATENT DOCUMENTS

| | | | | |
|---|---|---|---|---|
| 4,691,277 | A * | 9/1987 | Kronstadt | G06F 9/3806 711/213 |
| 5,226,130 | A * | 7/1993 | Favor | G06F 9/3812 712/E9.059 |
| 5,511,175 | A * | 4/1996 | Favor | G06F 9/3812 712/216 |
| 5,649,137 | A * | 7/1997 | Favor | G06F 9/3844 712/E9.059 |
| 5,699,536 | A * | 12/1997 | Hopkins | G06F 9/323 712/216 |
| 5,933,850 | A * | 8/1999 | Kumar | G06F 9/3853 712/E9.055 |
| 10,223,117 | B2 * | 3/2019 | de Perthuis | G06F 9/382 |
| 10,725,699 | B2 * | 7/2020 | Hsu | G11C 11/5628 |
| 10,747,539 | B1 * | 8/2020 | Hakewill | G06F 12/0875 |

(Continued)

OTHER PUBLICATIONS

Machine Translation of Japanese Patent Application JP H09198253 A, 1997. (Year: 1997).*

Primary Examiner — Steven G Snyder
(74) Attorney, Agent, or Firm — Brian D. Graham; Frank D. Cimino

(57) ABSTRACT

Systems and methods for validating operation of a software sequence may include: monitoring signals on a bus of a processor, comparing the contents of the signals on the bus to pre-stored information from compile time. If the comparing generates a match, that may indicate that the software sequence is operating as intended. However, if the comparing generates a mismatch, that may indicate that the software sequence is not operating as intended and may, in fact, indicate a malicious use. Further actions can be taken in response to a mismatch, including resetting a processor, issuing an interrupt, and the like.

20 Claims, 6 Drawing Sheets

(56) References Cited

U.S. PATENT DOCUMENTS

| | | | | |
|---|---|---|---|---|
| 10,933,882 B2* | 3/2021 | Golov | ............ | G05D 1/0088 |
| 11,567,855 B1* | 1/2023 | Fletcher | ............ | G06F 11/263 |
| 11,691,638 B2* | 7/2023 | Golov | ............ | B60W 50/023 |
| | | | | 701/23 |
| 2004/0215921 A1* | 10/2004 | Alexander | ............ | G06F 9/3802 |
| | | | | 712/E9.055 |
| 2006/0026403 A1* | 2/2006 | Chauvel | ............ | G06F 9/45504 |
| | | | | 712/226 |
| 2013/0111190 A1* | 5/2013 | Muff | ............ | G06F 9/30181 |
| | | | | 712/E9.028 |
| 2013/0179142 A1* | 7/2013 | Kim | ............ | G06F 30/33 |
| | | | | 703/14 |
| 2013/0339596 A1* | 12/2013 | Prasky | ............ | G06F 1/3275 |
| | | | | 711/108 |
| 2015/0178513 A1* | 6/2015 | Conti | ............ | G06F 9/30076 |
| | | | | 726/30 |
| 2016/0077834 A1* | 3/2016 | de Perthuis | ............ | G06F 9/382 |
| | | | | 712/201 |
| 2019/0179568 A1* | 6/2019 | Hsu | ............ | G06F 3/0604 |
| 2019/0193747 A1* | 6/2019 | Golov | ............ | B60W 50/023 |
| 2021/0163024 A1* | 6/2021 | Golov | ............ | G05D 1/0088 |
| 2023/0125616 A1* | 4/2023 | Glendinning | ............ | G06F 9/44505 |
| | | | | 713/2 |
| 2023/0214490 A1 | 7/2023 | Weinrib et al. | | |
| 2023/0339481 A1* | 10/2023 | Golov | ............ | B60W 50/0205 |

* cited by examiner

SYSTEMS AND METHODS FOR MONITORING AN INSTRUCTION BUS

TECHNICAL FIELD

The present disclosure relates generally to monitoring execution of processor instructions and, more specifically, to monitoring instructions on a bus.

BACKGROUND

Malicious users may attempt unauthorized access of resources. Fault injection attacks are one example of tools that allow attackers to access resources in a device (e.g., memory, interfaces, etc.). Attackers may obtain unauthorized access to resources by causing unpredictable system behavior and security breaches. Some techniques for injecting faults into a system may include voltage glitching injections, clock glitching injections, and electromagnetic fault injections (EMFIs). Fault injection attacks may cause instructions to be corrupted, instructions to be skipped during execution, arguments for instructions to be corrupted, improper execution flow, etc. For example, a fault injection attack may cause an authentication mechanism intended to protect access to a particular resource to be bypassed, thereby exposing access to the resource. While some software coding practices may improve the overall security to protect access to resources, such practices may not provide strong enough resilience against well-synchronized fault injection attacks (or other attacks).

SUMMARY

In one example, a method includes storing a first plurality of values in a first memory of a chip, wherein the first plurality of values corresponds to a plurality of lines of code of a plurality of functions; fetching a first instruction, which corresponds to a first line of code of the plurality of lines of code; monitoring an instruction bus of the chip, including reading a first address associated with the first instruction and a first address contents associated with the first instruction; comparing the first address contents to a first entry within the first plurality of values in the first memory; determining that a match exists between the first entry and the first address contents; and continuing to fetch subsequent instructions in response to determining that the match exists.

In another example, a system-on-chip (SoC) includes: a processing core; a first memory configured to store a first plurality of values, wherein the first plurality of values corresponds to a plurality of lines of code of a plurality of functions; a hardware logic unit, coupled to the processing core and an instruction bus, wherein the hardware logic unit is configured to: monitor signals on the instruction bus, including reading a plurality of address contents that are associated with a plurality of instructions fetched by the processing core; compare the plurality of address contents to a list of values, wherein the list of values is based at least in part on an execution sequence of the plurality of functions determined at compile time; determine that a mismatch exists between a first address contents of the plurality of address contents and a first value of the list of values; reset the SoC in response to the mismatch.

In yet another example, a system-on-chip (SoC) includes: a first memory configured to store a first plurality of values, wherein the first plurality of values corresponds to a plurality of lines of code of a plurality of functions; a hardware logic unit, coupled to an instruction bus, wherein the hardware logic unit is configured to: monitor signals on the instruction bus, including reading a plurality of address contents that are associated with a plurality of instructions that are fetched; compare the plurality of address contents to a list of values, wherein the list of values is based at least in part on an execution sequence of the plurality of functions determined at compile time; determine that a match exists between a first address contents of the plurality of address contents and a first value of the list of values; allow the SoC to continue operation in response to the match.

BRIEF DESCRIPTION OF THE DRAWINGS

Figure 1:
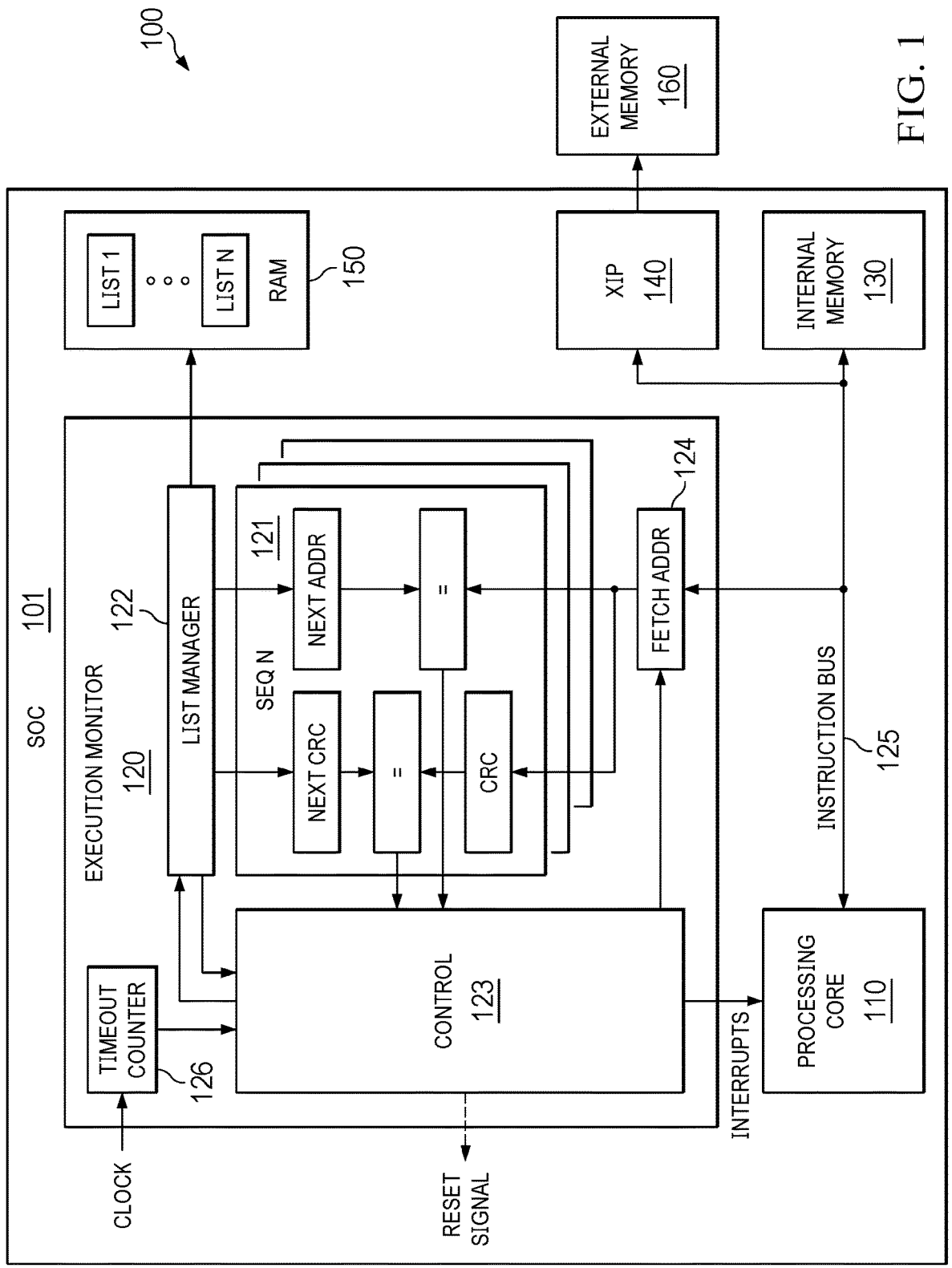

Having thus described the invention in general terms, reference will now be made to the accompanying drawings, wherein:

FIG. 1 is an illustration of an example system, having a module for instruction bus monitoring, according to various embodiments.

Figure 2:
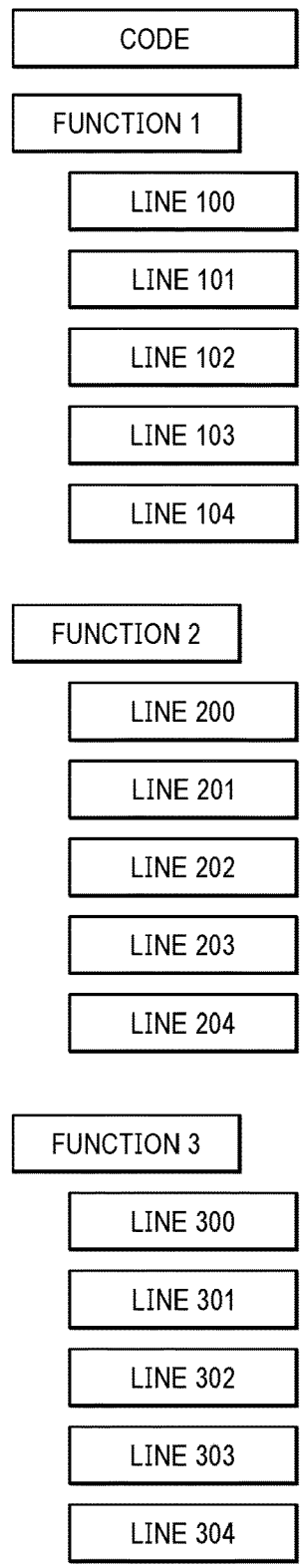

FIG. 2 is an illustration of a computer program, which may be adapted for use according to various embodiments.

Figure 3:
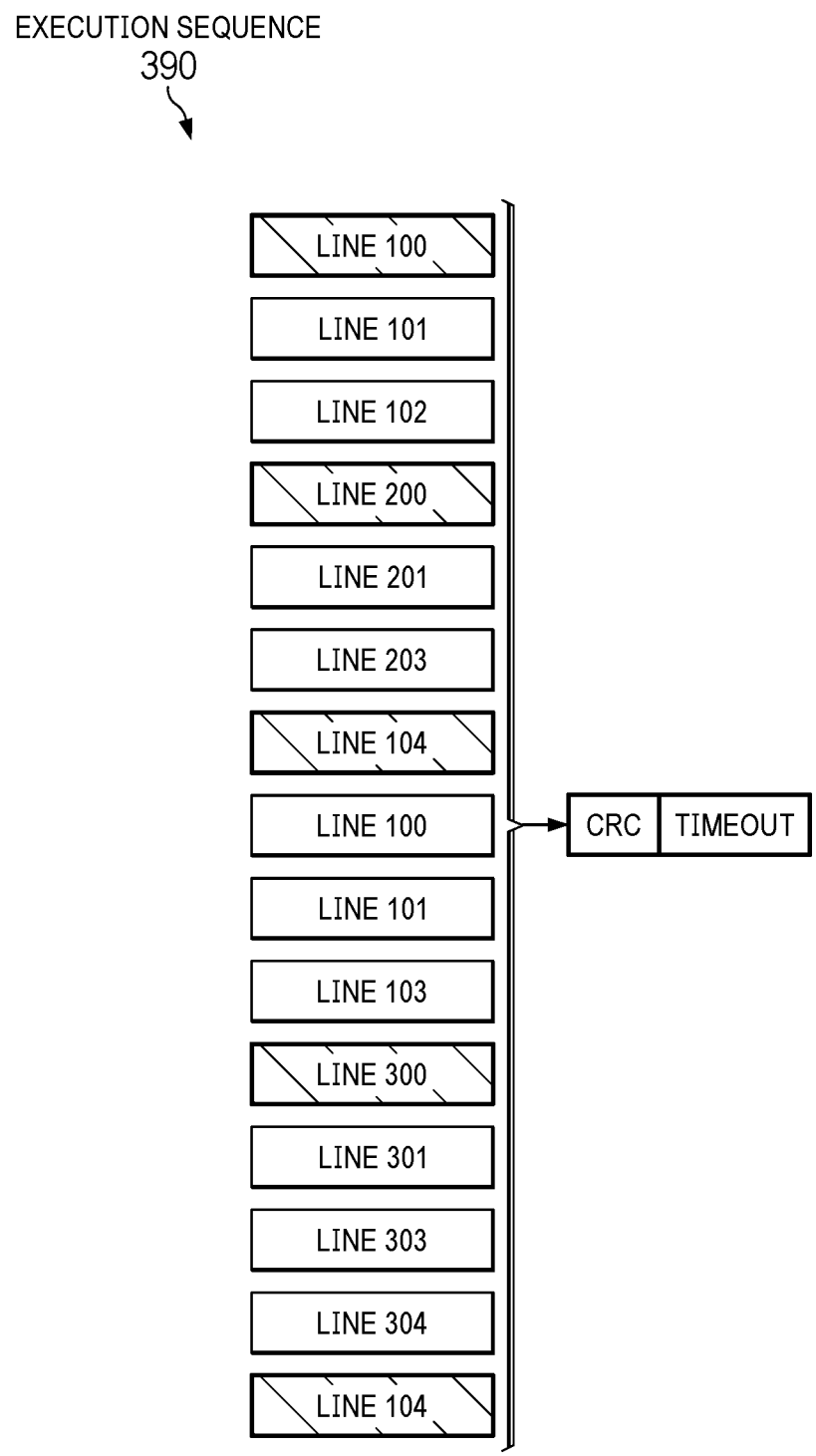

FIG. 3 is an illustration of an execution sequence, using the computer program of FIG. 2, according to various embodiments.

Figure 4:
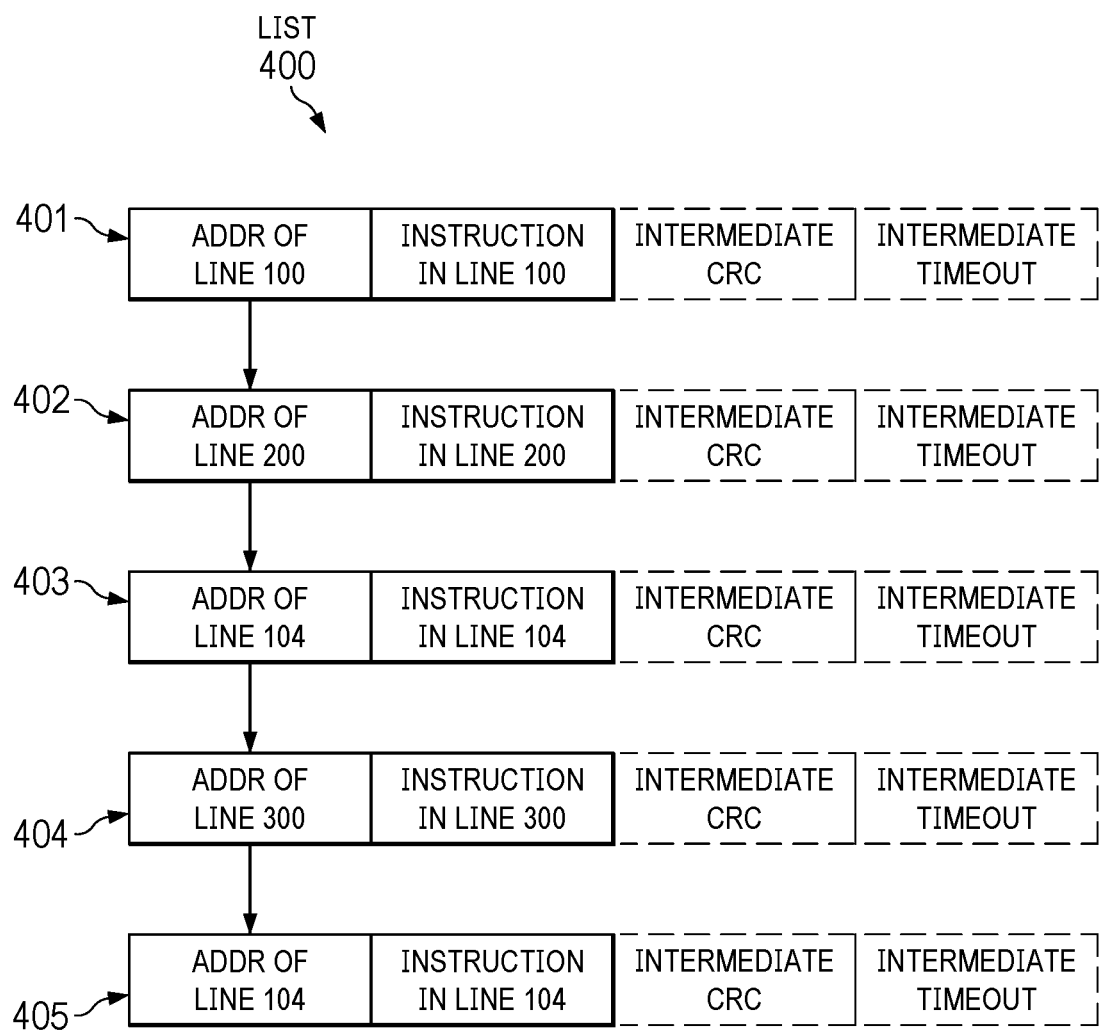

FIG. 4 is an illustration of information within an example list, according to various embodiments.

Figure 5:
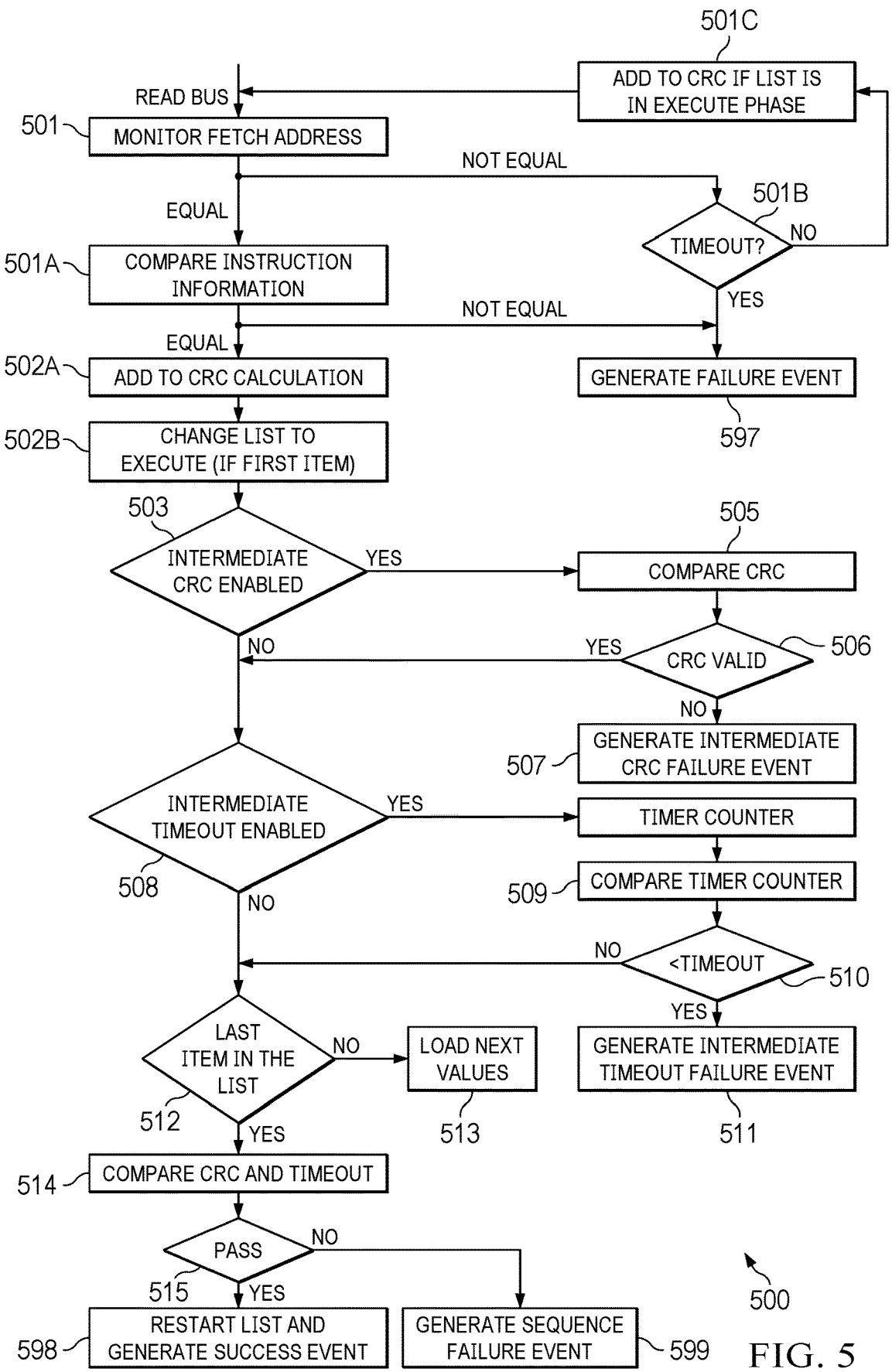

FIG. 5 is an illustration of an example method, which may be performed by the execution monitor of FIG. 1, according to various embodiments.

Figure 6:
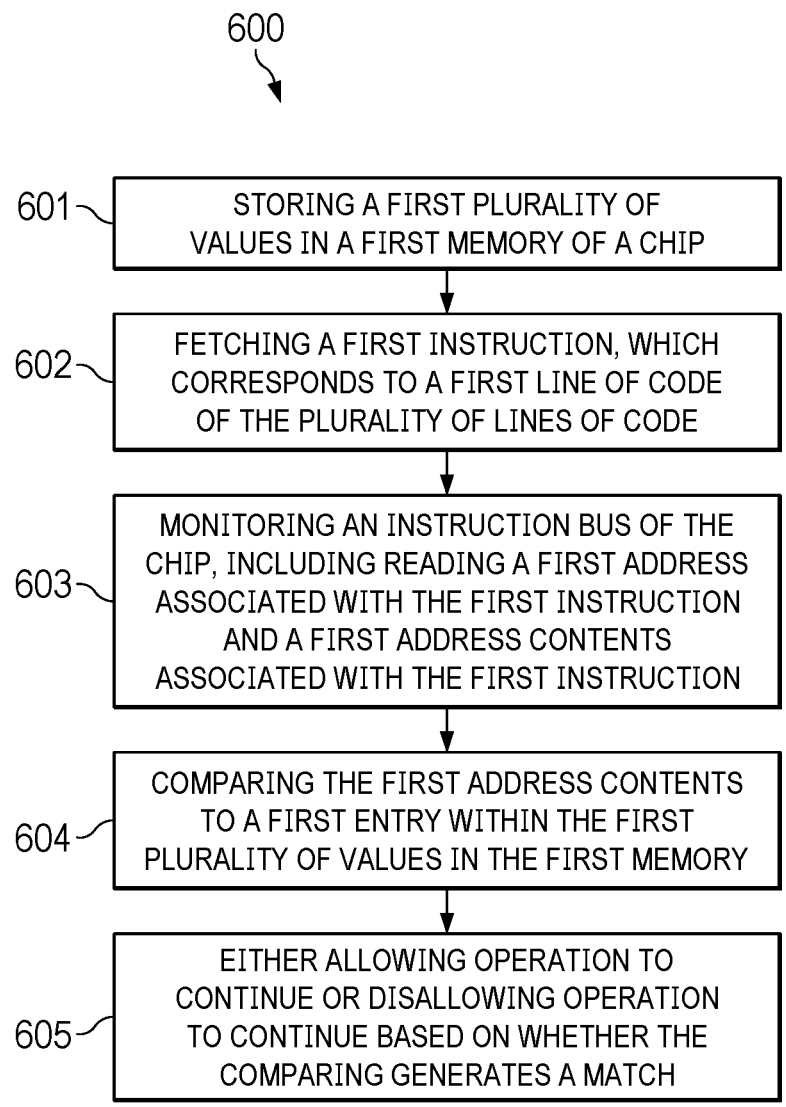

FIG. 6 is an illustration of an example method, which may be performed by the execution monitor of FIG. 1, according to various embodiments.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Corresponding numerals and symbols in the different figures generally refer to corresponding parts, unless otherwise indicated. The figures are not necessarily drawn to scale. In the drawings, like reference numerals refer to like elements throughout, and the various features are not necessarily drawn to scale.

The term "semiconductor die" is used herein. A semiconductor device can be a discrete semiconductor device such as a bipolar transistor, a few discrete devices such as a pair of power FET switches fabricated together on a single semiconductor die, or a semiconductor die can be an integrated circuit with multiple semiconductor devices such as the multiple capacitors in an analog-to-digital (A/D) converter. The semiconductor device may include passive devices such as resistors, inductors, filters, sensors, or active devices such as transistors. The semiconductor device may be an integrated circuit with hundreds or thousands of transistors coupled to form a functional circuit, for example a microprocessor or memory device. The semiconductor device may also be referred to herein as a semiconductor device or an integrated circuit (IC) die.

The term "semiconductor package" is used herein. A semiconductor package has at least one semiconductor die electrically coupled to terminals and has a package body that protects and covers the semiconductor die. In some arrangements, multiple semiconductor dies may be packaged together. For example, a power metal oxide semiconductor (MOS) field effect transistor (FET) semiconductor device and a second semiconductor device (such as a gate driver die, or a controller die) may be packaged together to from a single packaged electronic device. Additional components such as passive components, such as capacitors, resistors, and inductors or coils, may be included in the packaged electronic device. The semiconductor die is mounted with a package substrate that provides conductive leads. A portion of the conductive leads form the terminals for the packaged device. In wire bonded integrated circuit packages, bond wires couple conductive leads of a package substrate to bond pads on the semiconductor die. The semiconductor die may be mounted to the package substrate with a device side surface facing away from the substrate and a backside surface facing and mounted to a die pad of the package substrate. The semiconductor package may have a package body formed by a thermoset epoxy resin mold compound in a molding process, or by the use of epoxy, plastics, or resins that are liquid at room temperature and are subsequently cured. The package body may provide a hermetic package for the packaged device. The package body may be formed in a mold using an encapsulation process, however, a portion of the leads of the package substrate are not covered during encapsulation, these exposed lead portions form the terminals for the semiconductor package. The semiconductor package may also be referred to as a "integrated circuit package," a "microelectronic device package," or a "semiconductor device package."

Security has become a concern of Internet of things (IoT) devices from both regulatory and customers' demand. For instance, the cost of creating complex attacks has decreased significantly, and tools to run those attacks are seemingly widely available. One of the main attack vectors is to change the flow of the software running on a device, especially in sensitive and critical domains. An attack to change the flow of software may be achieved through techniques such as fault injection, stack overflows and memory overwrite, memory corruption through the reception of malformed packets, attacks on external interfaces, and the like.

While security is becoming more of a concern, increased security may necessarily increase complexity and, thus, cost of a device. However, competition may act to decrease the cost of devices. Therefore, there may be some trade-off between security and cost. Currently, most IoT devices incorporate a secure boot mechanism for validating and authenticating the instructions during boot time only. However, secure boot mechanisms do not validate the instructions in runtime.

Various embodiments herein provide for validating processor instructions during runtime. Various embodiments may protect from instruction changes after boot, which may be applicable to instructions that are fetched from external devices, since validating the instructions in boot time may not be conclusive in those systems. Various embodiments may also validate that the software is executing according to an expected sequence, especially in critical sections, such as for authorization mechanisms. Such embodiments may help to protect from malicious attacks, such as fault injection.

According to one example, a chip, such as a system on-chip (SoC) device may include an additional module that is executed independently from the processing core. An example of a processing core may include a microcontroller unit (MCU), though the scope of implementations is not limited to any particular processing core. In one example, the module monitors the execution of the processing core by monitoring fetch commands on the instruction bus. Continuing with the example, the additional module may manage a list of checkpoints within a section of the processor instructions and, during execution, the module may compare the fetched instruction to a current item in the list. Assuming that a monitored fetch is associated with a value that is equal to an item in the list, the module may allow the controller to continue fetching and executing instructions, and the module may then move the position in the list to the next item in the list.

According to one example, the module may also calculate and compare cyclic redundancy check (CRC) values of some or all of the instruction fetches during the sequence. Assuming that the CRC values match, the module may allow the controller to continue fetching and executing instructions.

According to one example, the module may include timeouts. During execution, any particular instruction execution may be subject to a timeout, or a given sequence of instructions may be subject to a timeout. Continuing with the example, the module may compare the timeout to the time it takes for execution to complete and, assuming the instructions execute within the time, the module may allow the controller to continue fetching and executing instructions.

On the other hand, a mismatch in fetch values, a mismatch in CRC values, or a timeout may result in a failure event. The failure event may be followed by any appropriate reaction. One example reaction includes the module sending an interrupt to the processing core to cause the processing core to stop or pause before further instructions are executed. In yet another example, a failure event may result in the module causing the chip itself to reset, thereby re-starting boot processes and instruction execution anew.

The scope of embodiments may include fetch comparison, CRC comparison, and timeouts layered to increase a complexity of an attack surface. The scope of embodiments may also include any one, two, or three of such features and may also include further features to improve security.

Various embodiments may include advantages over other solutions. For instance, monitoring fetches on an instruction bus may be performed relatively quickly and with hardware on the chip. Specifically, in the case of the module being a hardware module on the chip, the module may be implemented with relatively few additional gates and, thus, relatively little additional cost. The other features, such as CRC comparison and timeouts may also be implemented using relatively few additional gates. In other words, some embodiments described herein may provide additional security to a chip, such as by validating a sequence of instructions, and may be implemented in hardware on the chip to further provide speed during execution without adding excess cost to design or manufacture of the chip.

FIG. 1 is an illustration of an example system 100 having a module for instruction bus monitoring, according to various embodiments. The example system includes a system-on-chip (SoC) 101 coupled to an external memory 160, which may be implemented as Flash memory or other appropriate memory hardware. According to some embodiments, the SoC 101 may include a processing core 110. The processing core 110 may be part of a processor such as a central processing unit (CPU) or a microprocessor. External memory 160 may include non-transitory memory and may store instructions for execution by the processing core 110 (via XIP module 140) or may be another memory type for which lower latency memories are available in a memory hierarchy. Processing core 110 may request an instruction stored in the external memory 160 or stored in other locations, such as an internal memory 130 of the SoC 101, by providing a fetch request on an instruction bus 125 that specifies an address of the instruction and by receiving a response via the instruction bus that includes the instruction at the address from a memory (e.g., internal memory 130) or memory controller (e.g., XIP module 140) coupled to the instruction bus 125.

SoC 101 may be fabricated on a semiconductor die and may be included within a semiconductor package in some implementations. Further, the external memory 160 may be part of a separate semiconductor die or semiconductor package. However, the scope of implementations is not limited to any particular physical architecture for chip and package structures.

The instructions executed by the processing core 110, which may include a single core or multiple cores, are parts of one or more software programs. Software programs may be developed, encoded, and compiled in a variety of computing languages for a variety of software platforms and/or operating systems and subsequently loaded and executed by processing core 110. In some embodiments, the compiling process of the software program may transform program code written in a programming language to another computer language such that the processing core 110 is able to execute the programming code. For example, the compiling process of the software program may generate an executable program that provides encoded instructions (e.g., machine code instructions) for processing core 110 to accomplish specific, non-generic, particular computing functions. The encoded instructions may be loaded as computer executable instructions or process steps to processing core 110 from a memory external to the SoC 101, such as external memory 160, and/or a memory embedded within a same subsystem as processing core 110 (e.g., internal memory 130).

The SoC 101 may also include an execute-in-place (XIP) module 140. Generally, the XIP module 140 is a functional block that acts as a proxy for requests from the processing core 110 to regions of memory, such as external memory 160 or the like. According to some embodiments, the XIP module 140 includes one or more counters to track calls to various memory locations of the external memory 160. In some embodiments, a counter may be provided for each memory region, or slice, that is tracked. Similar to, but distinct from the caches of the processor, the XIP module 140 may copy instructions from a slower memory to a faster memory. However, in contrast to the internal memory 130, the XIP module 140 may store the copied data in a number of different types of memory scattered about the SoC 100, and also may selectively mirror instructions based on tracked usage statistics for memory blocks in the system. That is, the XIP module 140 is configured to intercept and redirect memory calls, and also maintain and selectively mirror memory blocks from memory devices throughout a system, such as on a same SoC as the XIP module 140, on memory external to the XIP module 140, and the like.

In some embodiments, the XIP module 140 may include logic which causes portions of the computer instructions stored in memory blocks of external memory 160 considered to be "hot spots" to be copied to other memory locations on memory devices associated with lower latency, such as internal memory 130. The XIP module 140 may identify the hot spots among the tracked memory by implementing logic to track access patterns and implement a state machine for determination of hot spots based on the tracking and for mirroring instruction blocks from the hot spots. In addition, XIP module 140 may be configured to store a table of mapped memory locations when portions of the instructions are copied from external memory 160 onto other memory locations. Accordingly, when the processing core 110 provides a transaction (e.g., an instruction fetch command) directed to a memory location on the target memory, the XIP module 140 may intercept the transaction, determine whether the instruction associated with the memory location has been mirrored to another, closer memory location, and if so, remap the transaction address. For example, if a particular instruction has been mirrored to an on-chip memory location, the XIP module 140 may remap the location and cause the instruction fetch to be performed with the on-chip memory location, thereby circumventing longer latency associated with calls to the external memory 160.

For the purposes of the example system 100, actions by the execution monitor 120 to fetch addresses from the instruction bus 125 may be performed without regard to the functionality of the XIP module 140. In other words, the intercepting, redirecting, and mirroring functions that are performed by XIP module 140 result in addresses and instructions being transmitted on the instruction bus 125. The fetch address module 124 taps the instruction bus at a location between the processing core 110 and the XIP module 140 and, thus, may be unaware of the intercepting, redirecting, and mirroring functions performed by XIP module 140. Furthermore, the scope of implementations include systems that employ an XIP module 140 as well as systems that do not employ an XIP module 140.

Random access memory (RAM) 150 is populated with lists (List 1 . . . List n). Each individual list corresponds to an instruction sequence, and it includes addresses and instructions associated with those addresses. In some embodiments, a given list in RAM 150 may include cyclic redundancy check (CRC) information and/or time out information. The addresses and instructions associated with the addresses, CRC information, and timeout information may be generated during compile time. For instance, a compiler may record, for an instruction sequence, addresses to be fetched on the instruction bus 125, instructions that are stored in those addresses, hashes of the addresses and/or instructions (e.g., CRC information), and appropriate time out limits. The compiler may further do the same for other instruction sequences for other lists.

Continuing with the example, the compiler may record addresses, instructions, and other information for all instructions in an instruction sequence or for only some but not all instructions in the instruction sequence. For instance, for some applications, it may be appropriate to record addresses, instructions, and other information for a set group of checkpoints that may represent only a fraction of the instructions of a given sequence. On the other hand, other applications may benefit from a higher level of security and, thus, the compiler may be caused to store addresses, instructions, and other information for nearly all, or all, instructions in an instruction sequence. Generally, there is a relationship between the number of instructions used to generate a list and the amount of memory devoted to a given list and, thus, to RAM 150. In other words, there may be a trade-off between size of RAM 150 and the number of instructions for which addresses, instructions, and other information may be recorded. The number of instructions used to generate lists may be determined as appropriate for a given application.

During boot time, booting processes may populate RAM 150 with the lists, including the recorded addresses, instructions, and other information for the instructions of one or more sequences. The relationship between instructions, sequences, and checkpoints is discussed in more detail with respect to FIGS. 2-4. During boot, a secure boot loader (not shown) may authenticate the instructions before execution may also authenticate the lists and load the lists to RAM 150. The lists may be signed with any cryptographic algorithm, and a given embodiment may use any appropriate cryptographic algorithm.

During runtime, execution monitor 120 is executing, and it includes functionality associated with list manager 122, address fetcher 124, controller 123, timeout counter 126, and logic module 121. Processing core 110 fetches instructions on instruction bus 125 from external memory 160, via XIP module 140. Address fetcher 124 taps the instruction bus 125 and it reads, for a particular instruction, an address and the instruction associated with the address. In an example, the address fetcher 124 receives a copy of a fetch command that specifies the address via the instruction bus 125 and receives a copy of a response to the fetch command that specifies the instruction at the address via the instruction bus 125. At the same time, list manager 122 reads a next item in a list from RAM 150, where the list corresponds to an instruction sequence that is being executed by the processing core 110. List manager 122 reads an address and a corresponding instruction in the item and sends the address and the corresponding instruction to logic unit 121. Logic unit 121 compares the address and instruction from the list to the address and instruction from the instruction bus and determines whether there is a match or a mismatch.

The existence of a match may indicate that the set of instructions has not been changed or that there is not some other kind of attack. In other words, the existence of a match may indicate that the instruction sequence is executing as was intended at compile time. On the other hand, a mismatch may indicate some kind of error or, perhaps, a malicious attack. An example of a mismatch includes an address being equal but the instruction information not being equal. Logic unit 121 indicates a match or a mismatch to control unit 123, which may take an action in response to the match or mismatch. In the case of a match, control unit 123 may load the next entry in the list and restart the timeout timer if appropriate, thereby letting the processing core 110 continue fetching and executing. On the other hand, in the case of a mismatch, control unit 123 may prevent further fetching and executing by the processing core 110, such as by transmitting an interrupt to processing core 110 or using a reset signal to reset SoC 101. Of course, the scope of implementations is not limited to any particular action that may be taken in response to a match or a mismatch, as other appropriate actions may be included in other applications.

As noted above, some implementations may further include use of hashes, such as CRC information, to further validate a sequence. In such an example, a given list at RAM 150 may include hashes for some or all addresses and instructions expected to be encountered during runtime. As the fetcher 124 receives an address and an instruction, it passes that information to the logic unit 121, which may add the address and instruction to an ongoing cyclic redundancy check (CRC)/hash calculation. The value calculated by the CRC/hash algorithm may be validated for a match on the next check point address. The logic unit 121 may compare the generated hash to the hash from the list and determine if there is a match or a mismatch. In some instances, a particular hash may apply only to a single instruction and, thus, the hash comparison may be line-by-line. Such line-by-line checking may be performed for all instructions or only a subset of instructions (e.g., checkpoints). In another example, the checking operation may be performed for a sequence as a whole. For instance, some or all of the instructions may be hashed, and then a mathematical operation may be performed on the hashes to generate a hash for the entire sequence. A given list at RAM 150 may also have a whole sequence hash, and logic unit 121 may compare the generated hash to the hash from the list and then indicate a match or a mismatch to control unit 123.

Furthermore, some implementations may also make use of timeouts. A given list at RAM 150 may include timeout information for all instructions or only some instructions. Furthermore, the timeout information may be either line-by-line or for the sequence as a whole. During runtime, the list manager 122 may read the timeout information from the list and provide that information to the control unit 123. The control unit 123 may then compare the timeout information to a timeout counter 126 to determine whether a given instruction or if the sequence as a whole has exceeded the timeout information. When a timeout has been exceeded, it may be treated similarly to a mismatch, and a timeout not being exceeded may be treated similarly to a match (as described above).

Execution monitor 120 may be implemented in any appropriate manner. For instance, some embodiments may implement execution monitor 120 as hardware logic, that is built from gates, onto the semiconductor die as part of the SoC 101. An advantage of such embodiment may include using a limited number of gates within a limited amount of space on the semiconductor die. Another possible advantage may include the speed associated with hardware logic execution when compared to, e.g., software logic execution. In yet another example, the execution monitor 120 may be implemented using software or firmware and executed by a more complex processing device than would be used in the hardware implementation. In a software or firmware implementation, the processing device that executes the software or firmware may be separate from the processing core 110. However, while a software or firmware implementation may be appropriate for some embodiments, it may be a more costly solution than implementing the execution monitor 120 in hardware logic. A particular implementation for execution monitor 120 may be chosen as appropriate for a given application. Operation of execution monitor 120 is described in more detail with respect to FIG. 5.

FIG. 2 is an illustration of a computer program 290, which may be adapted for use according to various embodiments. As noted above, a compiler may generate an executable program that provides encoded instructions (e.g., machine code instructions) for processing core 110 to accomplish specific, non-generic, particular computing functions. In this example, there are three functions for illustration purposes only, and it is understood that a particular program may include one or more functions as appropriate. An example of a function may include user authentication and the like.

Each function includes multiple lines of code. For instance, Function 1 includes Lines 100-104, Function 2 includes Lines 200-204, and Function 3 includes Lines 300-304. Of course, a function may include any appropriate quantity of lines of code. Each line of code may correspond to an address and an instruction that is transmitted to the processing core 110 on instruction bus 125.

FIG. 3 is an illustration of an execution sequence 390, using the computer program 290 of FIG. 2, according to various embodiments. A given flow, such as execution sequence 390, may include any appropriate order for the lines of code of the various functions. For instance, in the example of FIG. 3, some lines of Function 2 are performed before all of the lines of Function 1 are performed.

Furthermore, FIG. 3 illustrates check pointing. As noted above, a list at RAM 150 may include addresses, instructions, and other information for some or all of the lines of code in a given sequence. The shaded lines in FIG. 3—lines 100, 200, 104, 300, and 104—represent checkpoints, where a particular list may include addresses, instructions, and other information for only the check pointed lines and may omit any information from the lines that are not checkpoints. Thus, in one embodiment, a list may include addresses and instructions for lines 100, 200, 104, 300, and 104 and omit addresses and instructions for the other lines in the sequence. Additionally or alternatively, some embodiments may include a list having information for all of the lines of code for all functions in the sequence.

The same is true for CRC information and timeout information. For instance, the hashes associated with the CRC information may be computed for only the checkpoints and on a line-by-line basis and written to a list at RAM 150. Also, timeout information may apply only for the checkpoints and on a line-by-line basis and written to a list at RAM 150. Other embodiments may compute hashes for the whole sequence and may set timeout information for the whole sequence. As noted above, there may be a trade-off between an amount of information to be saved at RAM 150 and cost of SoC 101. Other hashes and timeouts may be computed on an intermediate basis, such as described with respect to FIG. 4 (below).

Furthermore, some embodiments may include multiple lists for a given execution sequence. For instance, a first list for execution sequence 390 may include information only for the checkpoints shown in FIG. 3. A second, different list at RAM 150 may include information for a different set of checkpoints within execution sequence 390.

Some embodiments may include a boot process that populates lists within RAM 150 on a pseudorandom basis. For instance, the boot process may populate a given list for execution sequence 390 that is different from the checkpoints shown in FIG. 3, where a subset of the lines are chosen according to a pseudorandom basis in an attempt to provide greater code line coverage during the lifetime of SoC 101 as the quantity of boot-ups grows. Nevertheless, some lines of code may be considered important enough to security of a device that they are always included within a list. As an example, a particular line may be critical to an authentication process, and the boot process may be configured to populate the list with information corresponding to that particular line regardless of whether other ones of the lines of code are included or not included in the list. Of course, the scope of embodiments may include any choice of lines, whether some or all, within a given application.

FIG. 4 is an illustration of information within an example list 400 at RAM 150, according to various embodiments. The example of FIG. 4 is directed toward the particular checkpoints shown in FIG. 3, though it is understood that a given list may be populated as appropriate, whether including other lines, all lines, lines according to a pseudorandom algorithm, or the like.

Example list 400 includes five entries—one for each checkpoint. A first entry 401 corresponds to an address that is referenced in line 100 of code. The first entry 401 also includes the contents that would be found at the address referenced by line 100, the contents being an instruction. Entry 401 may also include intermediate CRC information, such as a hash computed for the address referenced in line 100, the instruction at that address, and any addresses and instructions in previous lines. Intermediate timeout information may include timeout information based on a time for execution of the instruction at line 100 and for any previous lines.

Looking at example entry 402, it corresponds to the next checkpoint, line 200. Entry 402 includes an address referenced by line 200, an instruction stored at that address, and intermediate CRC value and an intermediate timeout value. The intermediate CRC value may be calculated with respect to line 200 and any previous lines. In this example, the lines previous to line 200 in execution sequence 390 include lines 102, 101, and 100. The intermediate timeout value may include timeout information based on a time of execution of the instruction at line 200 and for the previous lines 102, 101, and 100. The other entries 403-405 are generated similarly. As noted above, the information in the entries 401-405 may be generated during compilation and populated into a list at RAM 150 during boot time.

FIG. 5 is an illustration of an example method 500, which may be performed by execution monitor 120 of FIG. 1, according to various embodiments. Specifically, the different actions of method 500 may be performed as hardware logic executes or as firmware or software logic is executed during runtime.

Method 500 begins as a processing unit operates during runtime and, more specifically, during a fetch stage of the instruction cycle. The execution monitor 120 monitors the information on the instruction bus and acquires an address and a corresponding instruction, associated with a line of code at action 501. If the address does not match (i.e., "not equal") then the execution monitor 120 checks for a timeout at action 501B (only for execute phase). If there is no timeout, then the execution monitor 120 returns to read the bus again without error. If there is a timeout, then execution monitor 120 generates a failure event at action 597, which may include any appropriate action, such as transmitting an interrupt, resetting the SoC, etc. In any event, if the list is in the execute phase, then the address is added to the CRC calculation at action 501C. If there is a match (e.g., "equal") at action 501, then the execution monitor 120 allows the method 500 to continue to action 501A, in which the execution monitor 120 compares the instruction information to the content in the list. If there is a match, the logic 500 moves to action 502A (add address and/or instruction information to CRC calculation) and then changes the list to execute if it is the first item at action 502B; if there is a mismatch, then execution monitor 120 generates a failure event at action 597.

At action 502A, the execution monitor 120 calculates CRC information for the address and instruction retrieved at action 501. For instance, action 502A may include calculating a hash based on the address and instruction and then performing a mathematical operation, such as a Boolean addition operation, on the hash and any previous hashes for the sequence. The result of action 502A is an intermediate CRC value.

Assuming that the method 500 continues, and assuming that the list is not at an end at action 502B, then the actions may include further security validation, such as by CRC and/or timeouts. Specifically, actions 503 and 508 indicate that CRC checking and timeout checking may be enabled or disabled as appropriate. In other words, some embodiments may include any one of address content matching, CRC checking, timeout checking, or any combination thereof.

The calculated CRC value is compared to a CRC value from the list at RAM 150 at actions 505 and 506. If there is not a match between the calculated CRC value and the CRC value from the list, then the execution monitor 120 generates a CRC failure event at action 507. On the other hand, if there is a match at action 506, then method 500 proceeds to a timeout checking operation at action 508.

If timeout checking is not enabled, then method 500 moves to action 512. If timeout checking is enabled, then method 500 moves to actions 509 and 510, which include comparing a timer counter (e.g., timer counter 126) to an intermediate timeout value. In this example, the intermediate timeout value may include a timeout value associated with the particular line of code from action 501 in addition to timeout values associated with previous lines of code of the same sequence. If the comparison at action 510 shows that more time has elapsed than is given in the intermediate timeout value, then action 511 includes generating an intermediate timeout failure event. On the other hand, if the comparison at action 510 shows that the elapsed time is less than the intermediate timeout value, then method 500 moves to action 512. If it is not the last item in the list, then method 500 includes loading next values from the list at action 513. The method continues for additional items in the list, including performing action 501 and subsequent actions for each subsequent item in the list and each subsequent line of code in the sequence.

If it is at the end of the list, then the sequence has been completed. However, method 500 includes further checks. For instance, action 514 may include comparing a cumulative CRC value and a cumulative timeout value from the list to a newly generated cumulative CRC and a value from the timer counter. If the newly generated cumulative CRC value matches the cumulative CRC value from the list and if the newly generated timeout value is greater than the value from the timer counter, then the sequence as a whole passes at action 598. Otherwise, the sequence as a whole generates a failure event at action 599. In the event of a sequence pass, then the processing core 110 may determine to execute a different sequence or the same sequence or no sequence at all. As noted above, in the event of a failure, the execution monitor 120 may prevent the processing core 110 from executing further lines of code by generating in interrupt, resetting the SoC, or other appropriate action.

FIG. 6 is an illustration of an example method 600, which may be performed by execution monitor 120 of FIG. 1, according to various embodiments. Specifically, the different actions of method 600 may be performed as hardware logic executes or as firmware or software logic is executed.

Action 601 includes storing a first plurality of values in a first memory of a chip. An example is discussed above, where addresses, instructions, and other information may be stored as a list in RAM 150. An example of a list that may be stored at RAM 150 is illustrated in FIG. 4. The storing may be performed before runtime, such as at boot time. Actions 602-605 may be performed during runtime.

Action 602 includes fetching a first instruction. In this example, the first instruction corresponds to a first line of code of the plurality of lines of code. An example of fetching a first instruction may include the processing core 110 fetching an address and a contents stored at that address, during a fetch stage of an instruction cycle. The instruction may be fetched from an on-chip memory, from an off-chip memory, and/or with the assistance of an XIP module.

Action 603 includes monitoring an instruction bus of the chip. Action 603 may include reading a first address associated with the first instruction and a first address contents associated with the first instruction. In the example of FIG. 4, the address contents include instructions.

Action 604 includes comparing the first address contents to a first entry within the first plurality of values. For instance, the execution monitor 120 may compare the address contents to a reference value stored in an entry in a list in RAM 150. Of course, action 604 may include comparing both the address itself to a reference address in the list and the contents of the address to reference contents in the list.

Action 605 includes either allowing operation to continue or disallowing operation to continue based at least in part on whether the comparing generates a match. As noted above, if the comparing at action 501 results in a mismatch, then the execution monitor 120 may generate a failure event. A failure event may correspond to disallowing operation to continue, such as by transmitting an interrupt to the processing core 110, resetting the SoC, or the like. On the other hand, if the comparing at action 501 results in a match, then the execution monitor may allow operation to continue, such as by allowing the processing core 110 to execute further lines of code in the sequence.

The scope of implementations is not limited to the sequence of actions of method 600. Rather, some embodiments may add, omit, rearrange, or modify various actions. For instance, some embodiments may include checking a CRC calculation and/or checking a timeout status in addition to the actions 604-605. For instance, FIG. 5 illustrates checking CRC values (actions 504-506 and 507) and checking timeout status (actions 508-510, 511).

While various examples of the present disclosure have been described above, it should be understood that they have been presented by way of example only and not limitation. Numerous changes to the disclosed examples can be made in accordance with the disclosure herein without departing from the spirit or scope of the disclosure. Modifications are possible in the described embodiments, and other embodiments are possible, within the scope of the claims. Thus, the breadth and scope of the present invention should not be limited by any of the examples described above. Rather, the scope of the disclosure should be defined in accordance with the following claims and their equivalents.

What is claimed is:

1. A method comprising:
   storing a set of entries in a first memory of a chip, wherein each entry of the set of entries specifies a respective address and a respective instruction;
   fetching a first instruction, which corresponds to a first entry of the set of entries;
   monitoring a bus of the chip to determine the first instruction and a first address associated with the first instruction;
   comparing the first instruction as fetched to the respective instruction of the first entry;
   determining whether a match exists between the first instruction as fetched and the respective instruction of the first entry; and
   determining whether to continue to fetch subsequent instructions based on whether the match exists.

2. The method of claim 1, wherein the set of entries corresponds to a sequence of instructions, wherein the set of entries corresponds to a plurality of checkpoints, and wherein a quantity of the checkpoints is less than a total quantity of instructions in the sequence of instructions.

3. The method of claim 2, wherein a quantity of entries in the set of entries corresponds to a total quantity of instructions in the sequence of instructions.

4. The method of claim 1, further comprising:
fetching a second instruction, which corresponds to a second entry of the set of entries;
monitoring the bus of the chip to determine the second instruction and a second address associated with the second instruction;
comparing the second instruction as fetched to the respective instruction of the second entry;
determining that a mismatch exists between the second instruction as fetched and the respective instruction of the second entry; and
resetting the chip in response to determining that the mismatch exists.

5. The method of claim 1, wherein the first memory comprises on-chip random-access memory (RAM), and wherein fetching the first instruction comprises receiving the first instruction over the bus from a second memory, wherein the second memory is implemented off-chip.

6. The method of claim 1, further comprising:
performing a boot operation of the chip, wherein the boot operation includes loading the set of entries to the first memory.

7. The method of claim 6, wherein each entry of the set of entries corresponds to a respective checkpoint of a set of instructions, further wherein the storing of the set of entries in the first memory includes pseudo-randomly selecting the set of entries from a larger set of entries that corresponds to a total quantity of instructions in the set of instructions.

8. The method of claim 1, further comprising:
generating a hash based on the first instruction as fetched; and
validating the hash, including comparing the hash to a reference hash stored in the first memory.

9. The method of claim 1, further comprising:
continuing to fetch the subsequent instructions based at least in part on the match existing;
wherein continuing to fetch the subsequent instructions is further performed in response to determining that execution of the first instruction did not exceed a timeout value.

10. A system-on-chip (SoC) comprising:
a processing core;
a first memory configured to store a set of entries, wherein each entry of the set of entries specifies a respective address and a respective instruction;
a hardware logic unit, coupled to the processing core and a bus, wherein the hardware logic unit is configured to:
monitor signals on the bus to determine a plurality of instructions fetched by the processing core;
compare the plurality of instructions as fetched to the set of entries, wherein the set of entries is based at least in part on an execution sequence of a plurality of functions determined at compile time;
determine whether a mismatch exists between a first instruction as fetched of the plurality of instructions and a first entry of the set of entries; and
determine whether to reset the SoC based on whether the mismatch exists.

11. The SoC of claim 10, wherein the hardware logic unit is further configured to:
calculate a hash corresponding to a second instruction as fetched of the plurality of instructions;
compare the hash to a reference hash; and
take action in response to comparing the hash to the reference hash.

12. The SoC of claim 10, wherein the hardware logic unit is further configured to:
determine that execution of the first instruction has exceeded a timeout; and
reset the SoC in response to the execution of the first instruction exceeding the timeout.

13. The SoC of claim 10, wherein the hardware logic unit is further configured to:
reset the SoC based on determining that the mismatch exists;
subsequent to the SoC being reset, determine that execution of a second instruction has not exceeded a timeout; and
allow execution of subsequent instructions to continue in response to the execution of the second instruction not exceeding the timeout.

14. The SoC of claim 10, wherein the hardware logic unit is further configured to:
monitor signals on the bus to determine a plurality of addresses corresponding to the plurality of instructions fetched by the processing core;
compare the plurality of addresses to the set of entries;
determine whether an address mismatch exists between a first address of the plurality of addresses and a second entry of the set of entries; and
determine whether to reset the SoC based on whether the address mismatch exists.

15. The SoC of claim 10, wherein the bus is in communication with an off-chip memory from which the plurality of instructions are fetched.

16. A system-on-chip (SoC) comprising:
a first memory configured to store a set of entries, wherein the set of entries corresponds to a plurality of functions;
a hardware logic unit, coupled to a bus, wherein the hardware logic unit is configured to:
monitor signals on the bus to determine a plurality of instructions that are fetched on the bus;
compare the plurality of instructions to the set of entries, wherein the set of entries is based at least in part on an execution sequence of the plurality of functions as determined at compile time;
determine whether a match exists between a first instruction as fetched of the plurality of instructions and a first entry of the set of entries; and
determine whether to allow the SoC to continue operation based on whether the match exists.

17. The SoC of claim 16, wherein the plurality of instructions correspond to a plurality of checkpoints.

18. The SoC of claim 16, wherein the bus is in communication with an off-chip memory from which the plurality of instructions are fetched.

19. The SoC of claim 16, wherein the hardware logic unit is further configured to:
calculate a hash corresponding to the plurality of instructions as fetched on the bus;
compare the hash to a reference hash; and
allow the SoC to continue operation in response to the hash and the reference hash matching.

20. The SoC of claim 16, wherein the hardware logic unit is further configured to:
determine that execution of a second instruction as fetched on the bus has not exceeded a timeout; and allow execution of the plurality of instructions to continue in response to the execution of the second instruction as fetched not exceeding the timeout.

\* \* \* \* \*